United States Patent
Fong

(10) Patent No.: US 8,204,864 B1
(45) Date of Patent: Jun. 19, 2012

(54) RESTARTABLE DUMP THAT PRODUCES A CONSISTENT FILESYSTEM ON TAPES

(75) Inventor: Yinfung Fong, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1021 days.

(21) Appl. No.: 10/831,959

(22) Filed: Apr. 26, 2004

Related U.S. Application Data

(63) Continuation of application No. 09/804,675, filed on Mar. 12, 2001, now Pat. No. 6,728,735.

(51) Int. Cl.
*G06F 7/00* (2006.01)

(52) U.S. Cl. .......................... 707/687; 707/790

(58) Field of Classification Search ............... 707/104.1, 707/100, 10, 3, 999.2, 999.104, 687, 690
See application file for complete search history.

(56) References Cited

U.S. PATENT DOCUMENTS

| | | | |
|---|---|---|---|
| 4,907,150 A | 3/1990 | Arroyo et al. | |
| 5,008,786 A | 4/1991 | Thatte | |
| 5,043,871 A * | 8/1991 | Nishigaki et al. | 707/202 |
| 5,163,148 A | 11/1992 | Walls | |
| 5,241,670 A | 8/1993 | Eastridge et al. | |
| 5,497,483 A | 3/1996 | Beardsley et al. | |
| 5,504,883 A | 4/1996 | Coverston et al. | |
| 5,566,297 A | 10/1996 | Devarakonda et al. | |
| 5,604,862 A | 2/1997 | Midgely et al. | |
| 5,644,718 A | 7/1997 | Belove et al. | |
| 5,664,155 A * | 9/1997 | Elko et al. | 711/170 |
| 5,692,121 A | 11/1997 | Bozso et al. | |
| 5,721,918 A | 2/1998 | Nilsson et al. | |
| 5,819,292 A | 10/1998 | Hitz et al. | |
| 5,832,508 A * | 11/1998 | Sherman et al. | 1/1 |
| 5,835,953 A | 11/1998 | Ohran | |
| 5,907,672 A | 5/1999 | Matze et al. | |
| 5,907,673 A * | 5/1999 | Hirayama et al. | 714/16 |

(Continued)

FOREIGN PATENT DOCUMENTS

DE  69425658  4/2001

(Continued)

OTHER PUBLICATIONS

Steven R. Kleiman et al., "Using NUMA Interconnects for Highly Available Filters," Jan.-Feb. 1999, IEEE.

(Continued)

*Primary Examiner* — Khanh Pham
*Assistant Examiner* — Eliyah S Harper
(74) *Attorney, Agent, or Firm* — Blakely, Sokoloff, Taylor & Zafman LLP

(57) ABSTRACT

The invention provides a method and system for performing a dump operation that preserves partial results of an aborted or interrupted dump, and allows restarting the dump from near where it was stopped. Thus, tapes from the original dump, plus tapes from the restarted dump, can be combined to provide a consistent subset of a filesystem. In a preferred embodiment, the dump operation is performed on a consistent recorded snapshot of the filesystem, so that the subset of the filesystem recorded on the tapes is itself consistent. As an emergent consequence, the dump operation is freely interruptable, restartable, and provides a set of tapes that maintain a consistent subset of the filesystem that is transparent to tape-restore operations and other operations to be performed on the filesystem as it was recorded on tape.

19 Claims, 2 Drawing Sheets

U.S. PATENT DOCUMENTS

| | | | |
|---|---|---|---|
| 5,950,218 A * | 9/1999 | Howard | 711/4 |
| 5,963,962 A | 10/1999 | Hitz et al. | |
| 6,038,379 A * | 3/2000 | Fletcher et al. | 709/230 |
| 6,038,665 A | 3/2000 | Bolt et al. | |
| 6,078,932 A | 6/2000 | Haye et al. | |
| 6,115,781 A * | 9/2000 | Howard | 711/4 |
| 6,173,290 B1 * | 1/2001 | Goldberg | 707/687 |
| 6,360,330 B1 | 3/2002 | Mutalik et al. | |
| 6,374,267 B1 * | 4/2002 | Tam | 1/1 |
| 6,411,969 B1 * | 6/2002 | Tam | 1/1 |
| 6,460,054 B1 * | 10/2002 | Grummon | 707/204 |
| 6,473,869 B2 | 10/2002 | Bissett et al. | |
| 6,493,729 B2 * | 12/2002 | Gusler et al. | 707/204 |
| 6,654,912 B1 * | 11/2003 | Viswanathan et al. | 714/42 |
| 6,662,307 B1 * | 12/2003 | Sipple et al. | 714/2 |
| 6,728,735 B1 * | 4/2004 | Fong | 707/204 |
| 6,816,175 B1 * | 11/2004 | Hamp et al. | 715/854 |
| 6,920,467 B1 * | 7/2005 | Yoshimoto | 707/687 |
| 6,963,882 B1 * | 11/2005 | Elko et al. | 1/1 |
| 7,065,516 B1 * | 6/2006 | Bergan | 707/687 |
| 2001/0051955 A1 * | 12/2001 | Wong | 707/201 |
| 2002/0152230 A1 * | 10/2002 | Gusler et al. | 707/204 |
| 2004/0153736 A1 * | 8/2004 | Viswanathan et al. | 714/6 |

FOREIGN PATENT DOCUMENTS

| | | |
|---|---|---|
| EP | 0410630 | 1/1991 |
| EP | 0702815 | 3/1996 |
| EP | 0767431 | 4/1997 |
| WO | WO 94/29807 | 12/1994 |
| WO | WO 00/07104 | 2/2000 |

OTHER PUBLICATIONS

SLASHDOT:TUX2: "The Filesystem That Would Be King," Oct. 17, 2000.

* cited by examiner

RESTARTABLE DUMP THAT PRODUCES A CONSISTENT FILESYSTEM ON TAPES

CROSS-REFERENCE TO RELATED APPLICATION

This application hereby incorporates by reference and claims benefit of U.S. application Ser. No. 09/804,675, filed Mar. 12, 2001, now U.S. Pat. No. 6,728,735.

BACKGROUND OF THE INVENTION

1. Field of the Invention

This invention relates to backup and recovery of data.

2. Related Art

Computer systems typically rely on mass storage systems to store and retrieve data generated or used by the computer system. File servers ("filers") are one such set of computer systems that offer the ability to store and retrieve relatively large amounts of data, and to make the data highly available to clients and client devices that wish to access that data. Generally, filers can use magnetic, magneto-optical, or optical mass storage, so as to provide relatively rapid access to data. These types of storage are relatively fast and reliable, particularly when used with fault-tolerant techniques, such as a RAID (redundant array of independent disks) configuration.

Filers, while relatively reliable, are occasionally subject to corruption or loss of data. Known techniques for addressing this problem include maintaining copies of the data in a separate filesystem, one that hopefully will not lose data simultaneously with the original filesystem. These copies can be maintained either (a) in a second filesystem recorded similar to the first, that is, on magnetic mass storage; or (b) on a different type of mass storage medium, such as magnetic tape. The first of these known techniques is sometimes called "mirroring"; the second these known techniques is sometimes called "dump" (or "dump to tape"). The invention described in this application primarily relates to dump operations, but those of ordinary skill in the art will recognize, after perusal of this application, that the principles of the invention can be applied to other techniques for data backup, including mirroring and related techniques.

One problem in the known art is that the amount of storage recorded at filers has increased dramatically over time. It is presently not uncommon for storage in these devices to be measured in trillions of bytes (Terabytes), and for a dump operation to take many hours, and to use dozens of tapes for storage of an entire filesystem. If there is an error (either due to a problem at the filer, or due to a problem at the tape drive) in the middle of the dump operation, the entire dump operation is aborted and restarted at the beginning. For example, the dump operation sometimes fails before completion due to errors or interruptions, such as errors in writing to tape, power failures, filesystem errors at the filer, user interruption (accidental or otherwise), and the like. If the dump operation is aborted and restarted at the beginning, it is wasteful of the effort already expended during the dump operation that was aborted (and consequently more wasteful the more of the dump operation had been completed by then). Moreover, an error during the dump operation is more and more likely when the amount of information being dumped to tape is larger and larger and the dump operation is longer and longer. Thus, the average time it takes to complete a successful dump (after restarting due to errors, and finally running to completion) increases more than linearly with the size of the filesystem.

Accordingly, it would be advantageous to provide a method for the backup of data that is not subject to the limitations of the known art. This advantage is achieved in an embodiment of the invention that allows partial results of the dump to be preserved, and the dump to be restarted at a point relatively close to where the failure occurred.

SUMMARY OF THE INVENTION

The invention provides a method and system for performing a dump operation that preserves partial results of an aborted or interrupted dump, and allows restarting the dump from near where it was stopped. Thus, tapes from the original dump, plus tapes from the restarted dump, can be combined to provide a consistent subset of a filesystem. In a preferred embodiment, the dump operation is performed on a consistent recorded snapshot of the filesystem, so that the subset of the filesystem recorded on the tapes is itself consistent. As an emergent consequence, the dump operation is freely interruptable, restartable, and provides a set of tapes that maintain a consistent subset of the filesystem that is transparent to tape-restore operations and other operations to be performed on the filesystem as it was recorded on tape.

Those of ordinary skill in the art will recognize, after perusal of this application, the many advantages provided by restartable dump. These include, but are not limited to, the following:

The invention increases the likelihood that a dump is completed in a scheduled time window. For example, if the dump operation is scheduled to begin and end within a selected time window, the ability to continue from relatively near where a failure occurred increases the likelihood that the entire dump will be completed before the time window is over.

The invention increases the effective throughput of the dump operation. If a dump stops in the middle, less time is wasted when the dump is restarted; the dump is able to restart from relatively near where it was aborted or suspended.

The invention reduces the penalty of a failed dump. As noted herein, the penalty for a dump that is aborted or suspended is limited, with restartable dump, to only a small portion of the dump that was not "committed" for restartability.

The invention provides a consistent file system recorded on tape. As noted herein, the set of tapes used prior to the dump being aborted or suspended, plus the set of tapes used when the dump is completed, can be combined to form a consistent filesystem. As an emergent consequence, knowledge of whether the dump was ever suspended and resumed, or simply ran to completion the first time, need not be considered by other elements of the filer.

In a preferred embodiment, a restartable dump allows users to manage backup operations; users can freely suspend and resume dump operations when they deem appropriate. The following are some examples of additional capabilities available to users with restartable dump:

Users can suspend and resume dump operations to avoid time windows of relatively heavy traffic for filer requests.

Users can suspend and resume dump operations to avoid contention for other relatively limited filer resources (such as tape drives).

Users can suspend and resume dump operations to avoid contention with other, higher priority, dump operations.

Designers can build other capabilities into the filer that make use of restartable dump, such making those operations that depend on dump operations also be restartable. Examples include dump copy operations and logical replication operations.

The invention has general applicability to recording of structured information (such as a filesystem) on an alternative medium (such as a tape drive) or in an alternative form (such as BSD dump format), not limited specifically to dump operations in a filer. Moreover, techniques used by a preferred embodiment of the invention for recording of structured information (such as a filesystem) can be used in contexts other than the specific applications disclosed herein.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Lexicography

The following terms refer or relate to aspects of the invention as described below. The descriptions of general meanings of these terms are not intended to be limiting, only illustrative.

dump—in general, copying a set of structured information (such as a subset of a filesystem) to an alternative location in an alternative format (such as a BSD tape dump format).

restore—in general, copying data, from the alternative media and the alternative format (or a copy thereof), back to the system using structured information (such as a subset of a filesystem), possibly to replace corrupted or lost data.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
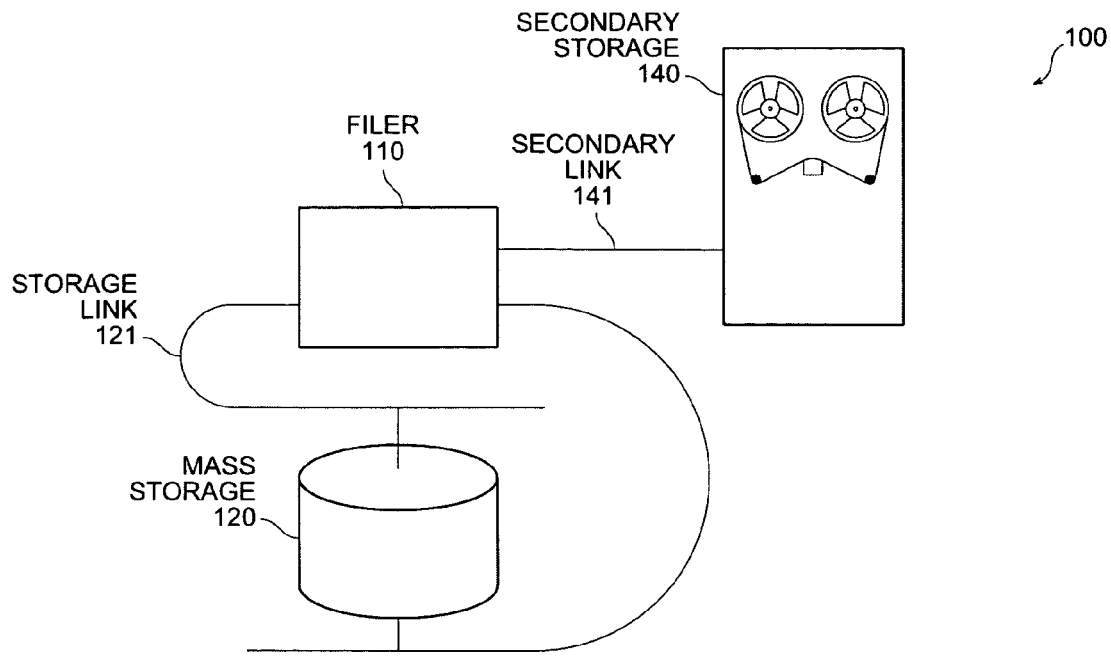
FIG. 1 shows a block diagram of a system for performing methods shown herein.

FIG. 1 shows a block diagram of a system for performing methods shown herein.

A system 100 includes a filer 110 (a file server capable of storage and retrieval of data, and capable of responding to filer requests with filer responses), mass storage 120, and secondary storage 140.

The filer 110 includes a processor, program and data memory, and software for executing instructions for performing the operations of a filer. The processor and program and data memory are known in the art, in several configurations used for filers. As described herein, the software is constructed or selected to perform the operations and steps described herein as related to embodiments of the invention.

In a preferred embodiment, the mass storage 120 includes a set of hard disk drives in a RAID configuration. In alternate embodiments, the mass storage 120 may include any combination of disk drives or other mass storage devices. Although the filer 110 and the mass storage 120 are shown in the figure as separate devices, there is no particular requirement that they must be physically separate. Rather, in preferred embodiments, the filer 110 and the mass storage 120 are coupled in a single housing.

The system 100 includes a mass storage link 121, operative to couple the filer 110 with the mass storage 120. The filer 110 uses the mass storage link 121 to control the mass storage 120, directing mass storage 120 to read from and write to selected locations thereon. In a preferred embodiment, the primary storage link 121 can include a direct wire coupling, a high-availability cluster coupling, a SAN coupling, or a more remote coupling such as reference to a secondary server using a communication link. The communication link can include any alternative form of communication device, such as for example access to an Internet, intranet, extranet, virtual private network, wireless network, or some combination thereof.

The secondary storage 140 includes a tape drive capable of recording data to one or more tapes. The system 100 also includes a secondary link 141, operative to couple the filer 110 with the secondary storage 140. In a preferred embodiment, the secondary link 141 is similar in general nature and operation to the mass storage link 121.

Data Flow Diagram

Figure 2:
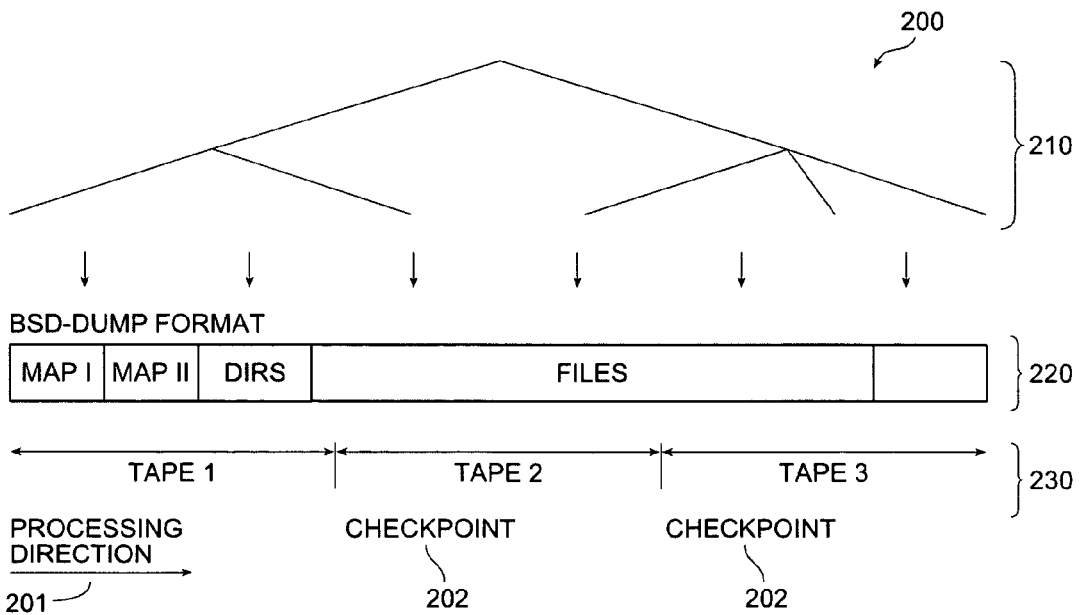
FIG. 2 shows a data flow diagram for methods shown herein.

FIG. 2 shows a data flow diagram for methods shown herein.

A data flow diagram 200 includes representations of a tree-structured filesystem 210, a linear dump format 220, and a plurality of target tapes 230.

In a preferred embodiment, the tree-structured filesystem 210 includes at least one volume of a WAFL filesystem.

In a preferred embodiment, the linear dump format 220 includes a BSD dump format, such as for example used with respect to UNIX file systems. The BSD dump format is known in the art of dump to tape operations. As shown in the data flow diagram 200, the BSD dump format includes a plurality of map sections (indicated as "Map I" and "Map II" in the figure), a directory section (indicated as "dirs" in the figure), and a files section (indicated as "files" in the figure). In a preferred embodiment, the plurality of map sections and the directory section consume less than one full tape worth of tape storage, so it is generally not necessary to be concerned with the possibility that there will be an error in the dump operation during those sections. Rather, the files section, which represents data from the tree-structured filesystem 210 and its associated files, can be quite lengthy, and can often consume a relatively large number of tapes worth of tape storage.

In a preferred embodiment, the plurality of target tapes 230 includes a sequence of individual target tapes (not shown), successively mounted on a tape drive such as the secondary storage 140 described with regard to FIG. 1. However, in alternate embodiments, the plurality of target tapes 230 may include a sequence of individual target tapes mounted on a plurality of tape drives, so long as the individual target tapes have a definitive sequence with regard to the dump operation.

As shown in the data flow diagram 200, a processing direction 201 indicates a direction of processing for the dump operation. The dump operation proceeds for the tree-structured filesystem 210 (or subset thereof), converting that tree-structured filesystem 210 into the linear dump format 220. As the linear dump format 220 is generated, it is copied to individual target tapes within the plurality of target tapes 230.

As each individual target tape is completed, a checkpoint 202 for the processing direction 201 is set, indicating how far the dump operation has proceeded. As shown herein, the operation of setting the checkpoint 202 is "atomic", in the sense that the checkpoint 202 is either definitively equal to an earlier value (indicating completion of the most recent tape), or definitively equal to a following value (indicating completion of the current tape). Thus, the checkpoint 202 is never set to a value that indicate anything other than the definitive end of a specific tape in the plurality of target tapes 230.

Method of Operation

Figure 3:
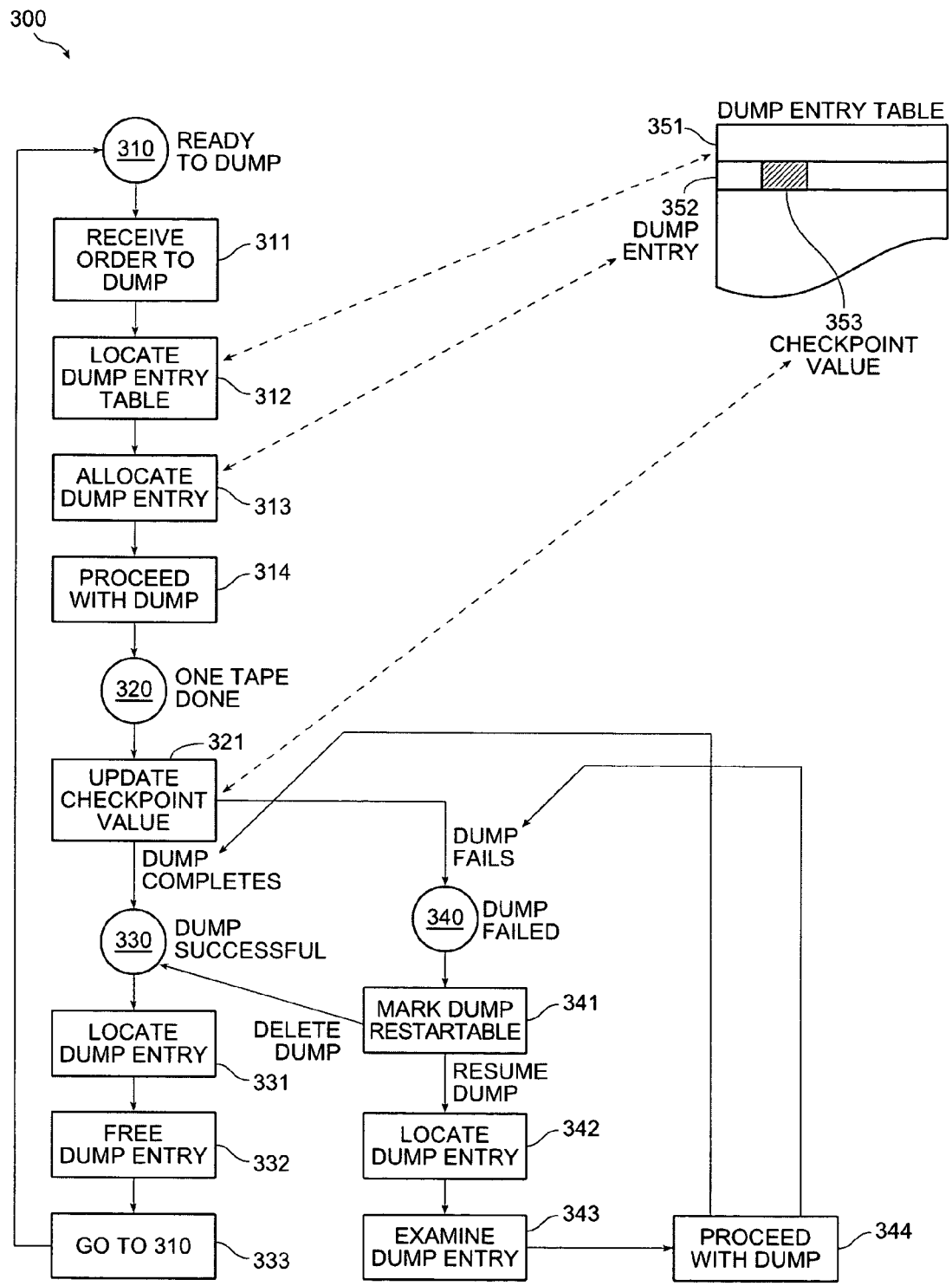
FIG. 3 shows a process flow diagram of methods shown herein.

FIG. 3 shows a process flow diagram of methods shown herein.

A method 300 includes a set of flow points and process steps as described herein.

Although by the nature of textual description, the flow points and process steps are described sequentially, there is no particular requirement that the flow points or process steps must be sequential. Rather, in various embodiments of the invention, the described flow points and process steps can be performed in a parallel or pipelined manner, either by one device performing multitasking or multithreading, or by a plurality of devices operating in a cooperative manner. Parallel and pipelined operations are known in the art of computer science.

At a flow point 310, the system 100 is ready to perform an individual dump operation.

In a preferred embodiment, each individual dump operation is performed independently, even if a plurality of dump operations are to be performed substantially simultaneously. In the latter case, if the plurality of dump operations do not interfere with each other with regard to system resources (such as tape drives), they can all proceed substantially simultaneously. However, if the plurality of dump operations do interfere with each other with regard to system resources, at least one must be suspended the so that others can proceed to completion.

At a step 311, the system 100 receives an instruction, either from an operator or user, or from a timed utility (such as a utility that attempts to perform a dump operation at 3:00 AM each morning), directing the system 100 to perform a dump operation.

At a step 312, the system 100 locates a dump entry table 351. The dump entry table 351 includes at least one dump entry 352, each one of which maintains information regarding a dump operation that is currently in progress.

At a step 313, the system 100 allocates a dump entry 352 in the dump entry table 351 for the particular dump operation that has been ordered. The dump entry 352 includes a checkpoint value 353, corresponding to the checkpoint 202 described with regard to FIG. 2.

At a step 314, the system 100 proceeds with dump operation, writing data to an individual tape in the plurality of target tapes 230.

At a flow point 320, the system 100 reaches the end of the individual tape in the plurality of target tapes 230.

At a step 321, the system 100 atomically updates the checkpoint value 353 with the checkpoint 202 described with regard to FIG. 2. As noted herein, the update of the checkpoint value 353 is atomic, in the sense that is not possible for the checkpoint value to be only partially updated at any point in time. Thus, the checkpoint value 353 always indicates the end of an individual tape in the plurality of target tapes 230, for which the dump operation has actually completed.

If the dump operation proceeds properly to completion, the method 300 proceeds with the flow point 330.

If the dump operation is interrupted, either by an error or by a deliberate act (such as an instruction to suspend the dump operation), the method 300 proceeds with the flow point 340.

Dump Operation Successful

At a flow point 330, the system 100 has successfully completed a dump operation.

At a step 331, the system 100 locates the dump entry 352 (in the dump entry table 351) associated with the completed dump operation.

At a step 332, the system 100 frees the dump entry 352.

At a step 333, the method 300 continues with the flow point 310.

Dump Operation Unsuccessful

At a flow point 340, the system 100 identifies itself as having at least one dump entry 352 (in the dump entry table 351) associated with a dump operation that did not complete successfully.

At a step 341, the system 100 marks the dump entry 352 as "RESTARTABLE", and reserves that dump entry 352 for later use. The system 100 will ultimately receive either an instruction (from an operator or user) to delete the dump operation, or an instruction to resume the dump operation.

If the system 100 receives an instruction to delete the dump operation, the system 100 proceeds with the flow point 330, just as if the dump operation had been successful (however, there will be no successful consistent plurality of target tapes 230 resulting from the dump operation).

If the system 100 receives an instruction to resume the dump operation, the system 100 proceeds with the next step 342.

At a step 342, similar to the step 331, the system 100 locates the dump entry 352 (in the dump entry table 351) associated with the suspended dump operation.

At a step 343, the system 100 examines the dump entry 352 and its corresponding checkpoint value 353, to determine which of the plurality of target tapes 230 the dump operation was last able to successfully complete.

At a step 344, the system 100 proceeds with the dump operation from the point indicated by the checkpoint value 343.

After this step, the system 100 can either successfully complete the dump operation, or might have the dump operation interrupted or suspended an additional time. If the dump operation is successfully completed, the method 300 proceeds with the flow point 330, as described above. If the dump operation is not successfully completed, the method 300 proceeds with the flow point 340, as described above.

Atomic Record of Dump Operation

In a preferred embodiment, the system 100 includes a WAFL filesystem, as described in further detail in the incorporated disclosures. Although a WAFL file system is preferred, those of ordinary skill in the art will realize, after perusal of this application, that any system 100 capable of maintaining a past consistent state of a filesystem would be workable, and is within the scope and spirit of the invention. Such a past consistent state of a filesystem is called a "snapshot" herein.

The system 100 maintains a snapshot from which the dump operation receives data indicating at least a subset of the consistent filesystem. The system 100 maintains the snapshot, not deleting any of its data or file blocks, until at least one of the following events:

The dump operation is successfully completed.
    The dump operation is permanently aborted by order of an operator.
    The snapshot is deliberately deleted by order of an operator (thus permanently aborting any dump operations relying on that snapshot.

If no recent snapshot is available for use by the dump operation when started, the system 100 creates a snapshot for that use. As an emergent consequence, the system 100 can continue to modify an active filesystem in response to requests by users, even while the dump operation is in process, because the snapshot is not itself altered while the active filesystem is in use. Thus, at least some reasons why a dump operation cannot proceed (due to users possibly modifying the active filesystem) do not interfere with the dump operation, and the dump operation can proceed anyway.

In a preferred embodiment, the dump table 351, and each of its dump entries 352, are maintained atomically, such as by known techniques for atomic storage of data on writable media. Alternatively, the dump table 351, and each of its dump entries 352, may be stored in a later snapshot of the filesystem, so that they can be retrieved by reference to that later snapshot.

Generality of the Invention

The invention has general applicability to recording of structured information (such as a filesystem) on an alternative medium (such as a tape drive) or in an alternative form (such as BSD dump format), not limited specifically to dump operations in a filer. Moreover, techniques used by a preferred embodiment of the invention for recording of structured information (such as a filesystem) can be used in contexts other than the specific applications disclosed herein.

Other and further applications of the invention in its most general form would be clear to those skilled in the art after perusal of this application. The invention would be usable for such other and further applications without undue experimentation or further invention.

Although preferred embodiments are disclosed herein, many variations are possible which remain within the concept, scope and spirit of the invention; these variations would be clear to those skilled in the art after perusal of this application.

The invention claimed is:

1. A method comprising the steps of:
performing, by a storage server, a dump operation from a set of storage blocks that form a snapshot of a consistent state of an active filesystem at a past time, said snapshot taken from said active filesystem at said past time, said dump operation including copying at least a subset of said set of storage blocks from said snapshot to a plurality of secondary storage devices using a linear dump format, wherein the plurality of secondary storage devices are used to recover the set of storage blocks in the event of a system failure after the dump operation is completed; and
setting a checkpoint, wherein the checkpoint comprises an indication of which blocks in the set of storage blocks said dump operation has successfully copied to one of the plurality of secondary storage devices as time proceeds, wherein the checkpoint is set to identify a physical end of an individual secondary storage device of the plurality of secondary storage devices for which the dump operation has actually completed, wherein said dump operation resumes copying to another of the plurality of secondary storage devices at a stage of the dump operation indicated by the checkpoint in the event of an interruption in performing said dump operation, and wherein the setting of a checkpoint is performed atomically, and wherein setting said each of the at least one checkpoints is performed at completion of a secondary storage device of the plurality of secondary storage devices.

2. A method as in claim 1, wherein the plurality of secondary storage devices comprises a plurality of individual target tapes successively mounted on a tape drive.

3. A method as in claim 1, wherein the plurality of secondary storage devices comprises a plurality of individual target tapes mounted on a plurality of tape drives.

4. A method as in claim 1, further comprising maintaining a dump entry table storing one or more checkpoint values corresponding to the at least one checkpoint.

5. A method as in claim 4, wherein the step of maintaining comprises updating said one or more checkpoint values corresponding to the at least one checkpoint, the step of updating being performed atomically.

6. A method as in claim 1, wherein the linear dump format used in performing a dump operation is a BSD format.

7. An apparatus comprising:
a mass storage device storing a set of storage blocks that form a snapshot of a consistent state of an active filesystem at a past time, said snapshot taken from said active filesystem at said past time;
a plurality of secondary storage devices;
a processor coupled to the mass storage device and to the plurality of secondary storage devices; and
a memory storing program instructions executable by the processor;
wherein the processor, under control of the program instructions, is capable of:
performing a dump operation from the snapshot, said dump operation including copying at least a subset of said set of storage blocks from said snapshot to the plurality of secondary storage devices using a linear dump format, wherein the plurality of secondary storage devices are used to recover the set of storage blocks in the event of a system failure after the dump operation is completed; and
setting a checkpoint, wherein the checkpoint comprises an indication of which storage blocks in the set of storage blocks said dump operation has successfully copied to one of the secondary storage devices as time proceeds, wherein the checkpoint is set to identify a physical end of an individual secondary storage device of the plurality of secondary storage devices for which the dump operation has actually completed, wherein said dump operation resumes copying to another of the plurality of secondary storage devices at a stage of the dump operation indicated by the checkpoint in the event of an interruption in performing said dump operation, and wherein setting at least one checkpoint indicative of progress in the course of preserving the indication of how far said dump operation has progressed, wherein setting each of the least one checkpoints is performed atomically, and wherein setting said each of the at least one checkpoints is performed at completion of a secondary storage device of the plurality of secondary storage devices.

8. An apparatus as in claim 7, wherein the plurality of secondary storage devices comprises a plurality of individual target tapes successively mounted on a tape drive.

9. An apparatus as in claim 7, wherein the plurality of secondary storage devices comprises a plurality of individual target tapes mounted on a plurality of tape drives.

10. An apparatus as in claim 7, wherein the processor, under control of the program instructions, is capable of maintaining a dump entry table storing one or more checkpoint values corresponding to the at least one checkpoint.

11. An apparatus as in claim 10, wherein the processor, under control of the program instructions, is capable of atomically updating said one or more checkpoint values corresponding to the at least one checkpoint.

12. An apparatus as in claim 7, wherein the linear dump format used in performing the dump operation is a BSD format.

13. An apparatus comprising:
means for performing a dump operation from a set of storage blocks that form a snapshot of a consistent state of an active filesystem at a past time, said snapshot taken from said active filesystem at said past time, said dump operation including copying at least a subset of said set of storage blocks from said snapshot to a plurality of secondary storage devices using a linear dump format, wherein the plurality of secondary storage devices are used to recover the set of storage blocks in the event of a system failure after the dump operation is completed; and
means for setting a checkpoint, wherein the checkpoint comprises an indication of which storage blocks in the set of storage blocks said dump operation has successfully copied to one of the plurality of secondary storage devices as time proceeds, wherein the checkpoint is set to identify a physical end of an individual secondary storage device of the plurality of secondary storage devices for which the dump operation has actually completed, wherein said dump operation resumes copying to another of the plurality of secondary storage devices at a stage of the dump operation indicated by the checkpoint in the event of an interruption in performing said dump operation, and wherein the setting of a checkpoint is performed atomically, wherein setting said each of the at least one checkpoints is performed at completion of a secondary storage device of the plurality of secondary storage devices.

14. An apparatus as in claim 13, wherein the plurality of secondary storage devices comprises a plurality of individual target tapes successively mounted on a tape drive.

15. An apparatus as in claim 13, wherein the plurality of secondary storage devices comprises a plurality of individual target tapes mounted on a plurality of tape drives.

16. An apparatus as in claim 13, further comprising means for maintaining a dump entry table storing one or more checkpoint values corresponding to the at least one checkpoint.

17. An apparatus as in claim 16, wherein the means for maintaining comprises means for updating said one or more checkpoint values corresponding to the at least one checkpoint, the step of updating being performed atomically.

18. An apparatus as in claim 13, wherein the linear dump format used in performing a dump operation is a BSD format.

19. A method comprising:
copying, by a storage server, data from a primary storage device to a plurality of secondary storage devices, wherein the plurality of secondary storage devices are used to recover the data in the event of a system failure after the copying is completed; and
setting a checkpoint, wherein the checkpoint comprises an indication of which data has been successfully copied to one of the plurality of secondary storage devices as time proceeds, wherein the checkpoint is set to identify a physical end of an individual secondary storage device of the plurality of secondary storage devices for which the dump operation has actually completed, wherein said copying to the plurality of secondary storage devices resumes at a stage of the copying indicated by the checkpoint in the event of an interruption in performing said copying, and wherein setting at least one checkpoint indicative of progress in the course of preserving the indication of how far said dump operation has progressed, wherein setting each of the least one checkpoints is performed atomically, and wherein setting said each of the at least one checkpoints is performed at completion of a secondary storage device of the plurality of secondary storage devices.

* * * * *